July 6, 1926.
C. H. BELL
RAKE
Filed Sept. 15, 1925
1,591,738
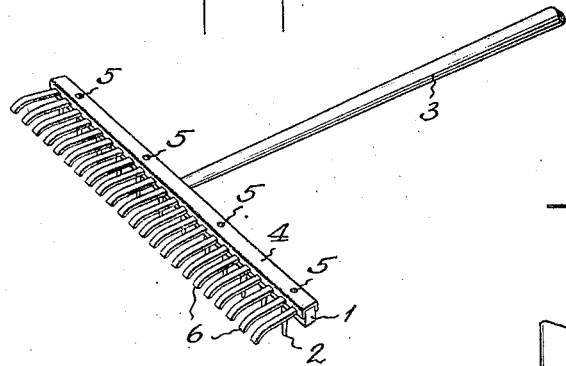
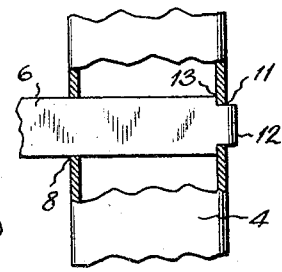
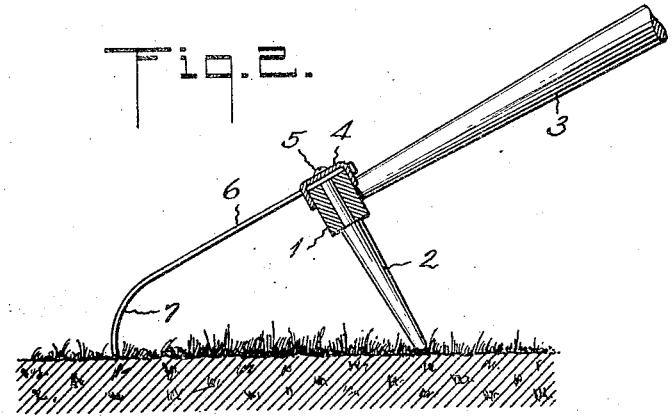
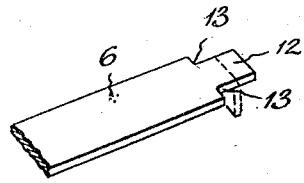
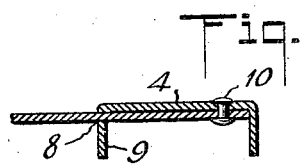
WITNESSES
INVENTOR
CHARLES H. BELL
BY
ATTORNEYS Patented July 6, 1926.

1,591,738

UNITED STATES PATENT OFFICE.

CHARLES HENRY BELL, OF THOMASTON, CONNECTICUT.

RAKE.

Application filed September 15, 1925. Serial No. 56,544.

This invention relates to rakes, and more particularly to an attachment for rakes, an object of the invention being to provide a rake with a series of flat spring teeth which are positioned at an angle to the ordinary teeth of the rake and which are adapted to flexibly and resiliently engage articles on the ground so as to facilitate the collection or movement of such articles.

My improved attachment is especially adapted for removing light articles such as leaves from the ground. The ordinary teeth of the rake being rigid will pass over the leaves while my improved arrangement of flat spring or resilient teeth will easily and effectually gather such leaves or other similar articles.

In other words, my improved attachment greatly increases the efficiency of a rake for many purposes, and of course I do not limit myself to the particular use but desire to cover broadly the construction for any use to which it can be put.

With these and other objects in view, the invention consists in certain novel features of construction and combinations and arrangements of parts, which will be more fully hereinafter described and pointed out in the claim.

In the accompanying drawings:—

Figure 1 is a perspective view illustrating my improved attachment in operative position on a rake;

Figure 2 is a view in longitudinal section;

Figure 3 is a fragmentary view in elevation of the teeth-carrying bar, showing certain of the teeth in section therein;

Figure 4 is a view in transverse section, showing one manner of securing the teeth to the supporting bar;

Figure 5 is a fragmentary perspective view of a modified form of tooth;

Figure 6 is a fragmentary sectional plan view, showing how a tooth, illustrated in Figure 5, is secured to the bar.

1 represents the head, 2 the teeth and 3 the handle of an ordinary rake. On the upper face of this head 2 I secure an inverted channel bar 4, preferably by means of screws 5, and to this channel bar 4 I secure a series of rearwardly projecting flat spring teeth 6, said teeth being preferably curved downwardly at their free ends as shown at 7.

The inverted channel bar 4 fits over the head 1 of the rake, and the flat teeth 6 may be secured in said bar in various ways, as, for example, as illustrated in detail in Figure 4, each tooth 6 may be projected through a slot 8 in one flange 9 of bar 4, and said tooth may be secured to the bar by a rivet 10 so as to hold the same rigidly connected to the bar.

Another form of securing the teeth is illustrated in Figures 5 and 6, in which the teeth 6 are formed with tongues 12 at one end, these tongues appearing narrower than the teeth so as to provide shoulders 13 at both edges thereof. The bar 4 is provided with slots 8 in one flange 9 and with narrower slots 11 in the other flange, of the proper width to receive the tongue 12, and when the tongue is projected through the narrower slot and bent at an angle, as illustrated in Figures 2, 4 and 6, the teeth will be secured without other attaching means.

By reason of an attachment of this character, I am enabled to more efficiently perform the raking function of gathering leaves and other lighter material, and I can use the attachment on any standard type of rake or use the attachment as a rake per se.

Various slight changes and alterations might be made in the general form of the parts described without departing from the invention and hence I do not limit myself to the precise details set forth but consider myself at liberty to make such slight changes and alterations as fairly fall within the spirit and scope of the appended claim.

I claim:

The combination with a rake, of an inverted channel bar, having its flanges located at opposite sides of the head of the rake, devices securing the bar to the rake, flat spring teeth projecting rearwardly from the bar and projecting through one flange of the bar and secured between the head of the rake and the bar.

CHARLES HENRY BELL.